United States Patent [19]
Boynton et al.

[11] 3,990,621
[45] Nov. 9, 1976

[54] STATIC HEAD SOLDERING SYSTEM WITH OIL

[75] Inventors: Kenneth G. Boynton; Alvin W. Hicks, both of Milford; Warren L. Johnston, Nashua; John Walega, Jr., Bedford, all of N.H.

[73] Assignee: Hollis Engineering, Inc., Nashua, N.H.

[22] Filed: Jan. 7, 1976

[21] Appl. No.: 647,321

[52] U.S. Cl. .............................. 228/37; 228/257; 228/260
[51] Int. Cl.² ..................................... B23K 3/06
[58] Field of Search ................ 228/36, 37, 40, 257, 228/260

[56] References Cited
UNITED STATES PATENTS

| | | | |
|---|---|---|---|
| 2,469,392 | 5/1949 | Jones et al. ........................ | 228/260 |
| 3,438,386 | 4/1969 | Diggins et al. .................... | 228/37 X |
| 3,612,388 | 10/1971 | Wegener et al. .................. | 228/36 X |

FOREIGN PATENTS OR APPLICATIONS

| 193,282 | 3/1967 | U.S.S.R. ............................... | 228/37 |
|---|---|---|---|

*Primary Examiner*—Al Lawrence Smith
*Assistant Examiner*—K. J. Ramsey
*Attorney, Agent, or Firm*—Schiller & Pandiscio

[57] ABSTRACT

A mass wave soldering system is described in which a standing wave of molten solder is formed from a static head of solder. The system comprises a soldering apparatus which has a two-compartment solder reservoir. The first compartment is designed to hold a first portion of the solder supply at a first liquid level with a layer of oil floating on the solder therein. The second compartment is designed for holding a second portion of the solder supply at a second liquid level above the first liquid level with a layer of oil floating on the solder therein. A sump and nozzle are positioned in the first compartment so that the sump is partially submerged in the molten solder therein, with the nozzle above the solder and oil levels therein, but below the solder and oil levels in the second compartment. The apparatus also includes a first conduit having an inlet disposed in the second compartment and an outlet disposed in the sump for carrying a flow of molten solder between the second compartment and the sump, and a second conduit having an inlet disposed in the second compartment for carrying a flow of oil from the second compartment and for depositing the oil onto the solder overflow adjacent the nozzle. Completing the apparatus are a conduit and pump for transferring molten solder and oil from the first compartment into the second compartment so as to maintain the liquid level of solder and the oil in the second compartment.

7 Claims, 3 Drawing Figures

STATIC HEAD SOLDERING SYSTEM WITH OIL

The present invention relates to systems for soldering electrical and electronic components onto substrate circuit boards, and more specifically to a wave soldering system for mass soldering components onto printed circuit boards.

Numerous wave soldering systems have been proposed in the art and are widely used commercially. A conventional prior art wave soldering machine typically comprises a reservoir for molten solder and a sump partially submerged in the reservoir. The sump has an inlet orifice adjacent its lower end, and an outlet nozzle adjacent the sump top end. A centrifugal pump is submerged in the body of solder and is adapted to force molten solder into the sump orifice and upwardly in the sump to overflow the nozzle to thereby provide a standing wave of molten solder adjacent the nozzle end, while the article to be soldered is moved along a path into engagement with the upper surface of the solder wave. Wave soldering offers many advantages over dip soldering including reduced board distortion, no accumulation of dross on the solder surface from coming in contact with the work, and precise temperature control. On the other hand, the art has experienced certain problems in obtaining smooth, non-turbulent solder waves of uniform height using conventional wave soldering machines of the above described type. For example, in a conventional wave soldering machine, even slight changes in the pump speed will effect the wave height. Another problem is that in a conventional wave soldering machine there is direct fluid communication between the pump outlet and the sump so that measures must be taken to eliminate turbulence from the pumping action to reach the resulting wave. In order to overcome this latter problem, the art devised various types of screens or baffles, e.g., honeycombs or "egg crate" type structures, for positioning in the solder sump between nozzle and the pump. While such screens or baffles can reduce substantially the amount of turbulence in the wave, the screens and baffles may not provide complete elimination of turbulence. Furthermore, the screens and baffles can become clogged which presents an additional problem.

In co-pending Application Ser. No. 609,241, filed by Kenneth G. Boynton on Sept. 2, 1975, and commonly assigned with the present application, there is disclosed an invention of a wave soldering system which obviates many of the above-noted difficulties in wave soldering. The Boynton invention employs a wave soldering machine in which the solder reservoir has two compartments, a first reservoir compartment designed to hold a portion of the solder supply at a first liquid level, and a second reservoir compartment designed for holding another portion of the solder supply at a second liquid level above the first liquid level. A sump and nozzle are positioned in the first compartment so that the sump is partially submerged in the molten solder therein, with the nozzle above the liquid level in the first compartment, but below the liquid level in the second compartment. Boynton also includes a conduit having an inlet disposed in the second compartment and an outlet disposed in the sump for carrying a flow of molten solder between the second compartment and the sump, and a pump and conduit for transferring molten solder from the first compartment into the second compartment so as to maintain the liquid level in the second compartment. Boynton reports that since there is no direct communication between the pump and the sump, slight fluctuations in pump speed will have little or no effect on the wave height which depends primarily on the solder level in the second compartment. Boynton also reports that the mass of solder in the second compartment provides a fluid buffer which substantially reduces turbulence and/or surging as may result from the mechanical pumping action of the pump, from reaching the solder wave.

This invention is an improvement on the soldering system described and claimed in the aforesaid copending application of Boynton.

It is a principal object of the present invention to provide an improved wave soldering system which overcomes the aforesaid problems of the prior art, and which system can produce a solder wave having an exceptionally smooth horizontal crest. Another object is to provide an improvement on the soldering machine incorporating the solder pumping system as described in Boynton U.S. Pat. application Ser. No. 609,241. Still other objects will in part appear obvious and will in part appear hereinafter.

The invention accordingly comprises the apparatus possessing the features, properties, and relations of elements which are exemplified in the following detailed disclosure and the scope of the application of which will be indicated in the claims.

In accordance with the present invention, this is provided a mass soldering system which includes a soldering machine in which the solder reservoir comprises two compartments. The first compartment is adapted to hold a first portion of a molten solder supply at a first liquid solder level with a layer of oil floating on the solder therein. The second compartment is designed for holding a second portion of the molten solder supply at a second liquid solder level above the first liquid solder level with a layer of oil floating on the solder therein. A sump and nozzle are positioned in the first compartment so that the sump is partially submerged in the molten solder therein, with the nozzle above the solder and oil levels in the first compartment, but below the solder and oil levels in the second compartment. The machine also includes a first conduit having an inlet disposed in the second compartment and an outlet disposed in the sump for carrying a flow of molten solder between the second compartment and the sump, and a second conduit having an inlet disposed in said second compartment for carrying a flow of oil from the second compartment and depositing this oil on the top of the solder overflow adjacent the nozzle opening. Completing the apparatus are means for transferring molten solder and oil from the first compartment into the second compartment so as to maintain the liquid level of solder and the oil in the second compartment. In a preferred embodiment of the invention the sump has at least one exterior sluice which is adapted to collect solder overflow from the nozzle and also the oil deposited on the solder overflow, and conduct the solder overflow and oil down the interior of the sluice into the first compartment at a point below the first liquid level.

For a fuller understanding of the objects of the present invention, reference should be had to the following detailed description taken in connection with the accompanying drawing in which.

Figure 1:
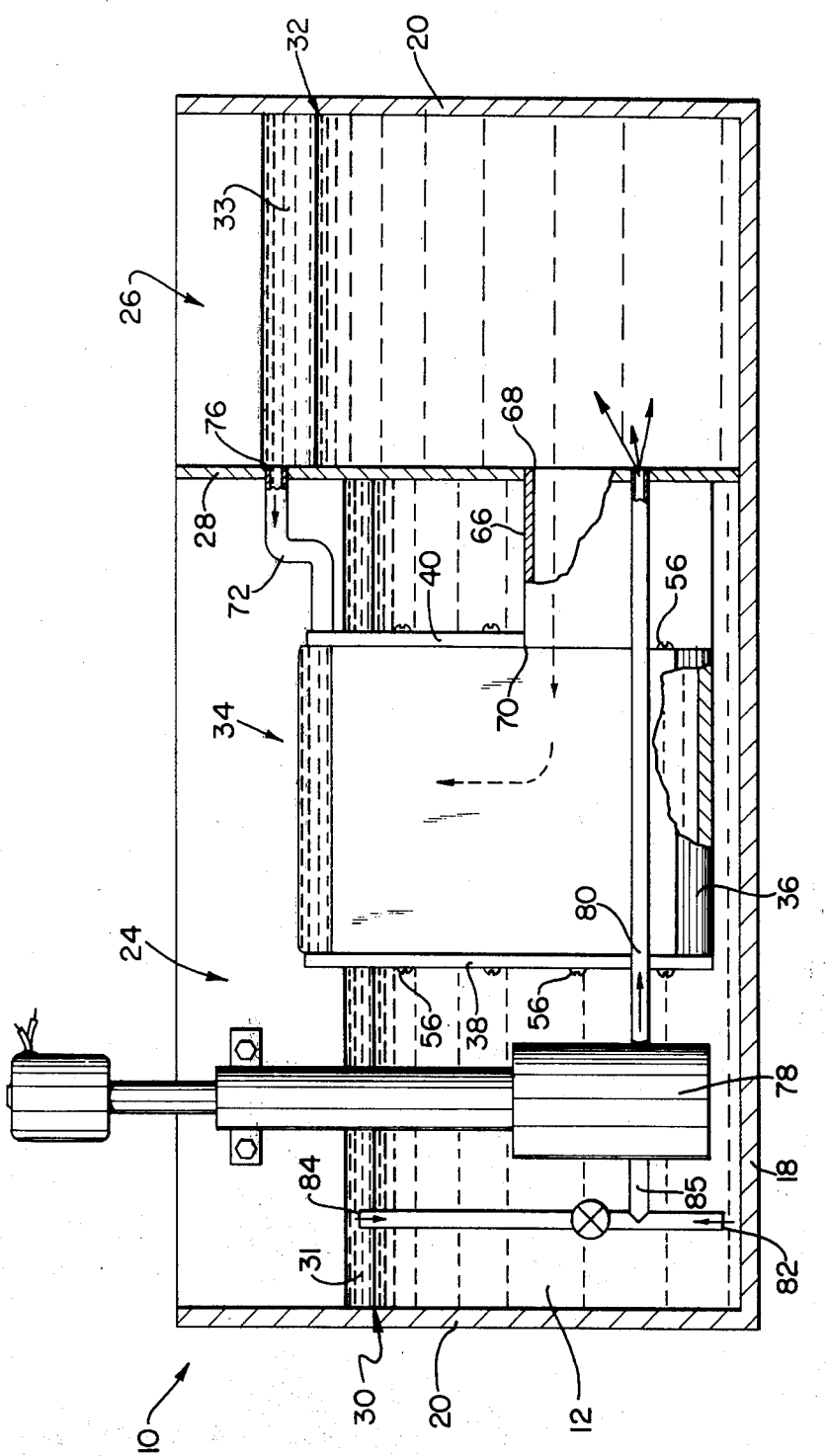
FIG. 1 is a side elevational view, partly in section, and showing a preferred embodiment of soldering apparatus of the present invention.
Figure 2:
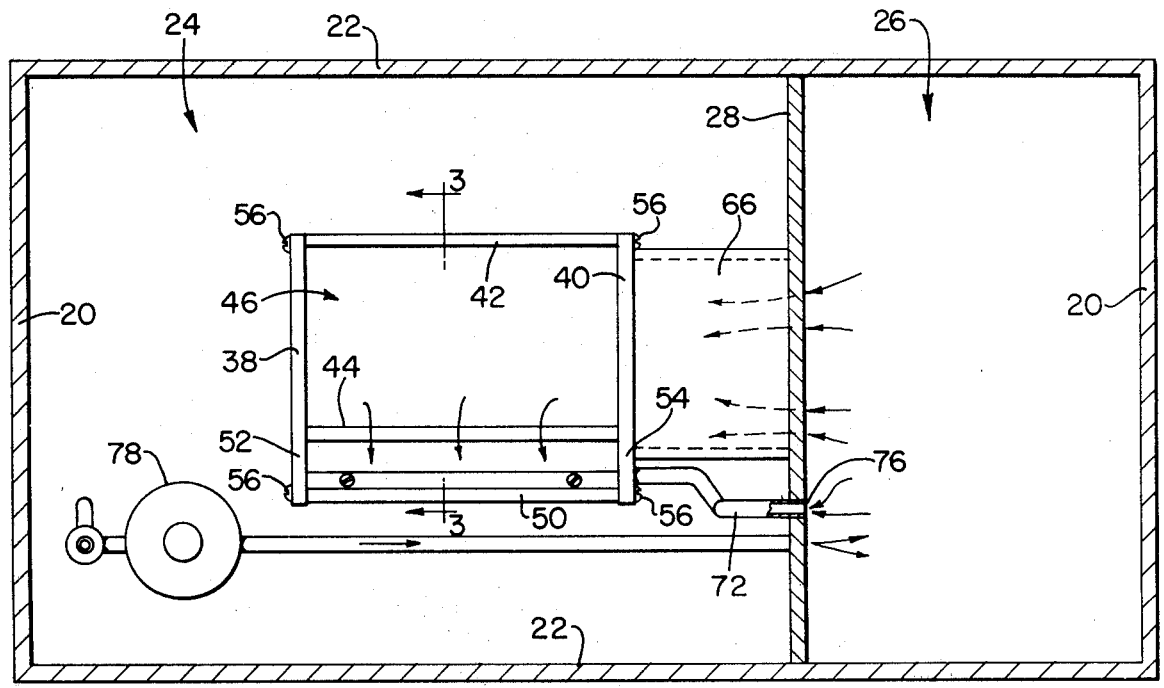
FIG. 2 is a plan view, partly in section of the apparatus shown in FIG. 1.

Referring now to the drawings, the illustrated apparatus includes a container indicated generally at 10 for holding a supply of molten solder 12. Container 10 comprises a rectangular container open at its top end, and comprising horizontal bottom wall 18 and vertical end walls 20 and side walls 22. Suitable heating means (not shown) may be secured to the bottom and/or side walls of the main reservoir compartment to heat and maintain the body of solder 12 in a molten state. Container 10 is divided into first and second compartments 24 and 26, respectively, by a common wall 28. First compartment 24 is adapted to hold a portion of the molten solder supply at a first liquid level 30 with a layer of oil 31 floating on top of the solder in the compartment 24. Second compartment 26 is adapted to hold another portion of the molten solder supply at a second liquid level 32 above the first liquid level 30 with a layer of oil 33 floating on top of the solder in the compartment 26.

A sump and nozzle assembly indicated generally at 34 is disposed interiorly of first compartment 24. The sump assembly 34 comprises a rounded bottom wall 36, a pair of substantially vertical extending opposed side walls 38 and 40, a substantially vertically extending rear wall 42, and an upwardly extending front wall 44 which is inclined towards rear wall 42 to define (together with side walls 38 and 40), a narrow elongated rectangular orifice or nozzle 46 which is above the solder and oil in compartment 24 by a suitable distance, e.g. one inch above the surface of the oil layer.

Figure 3:
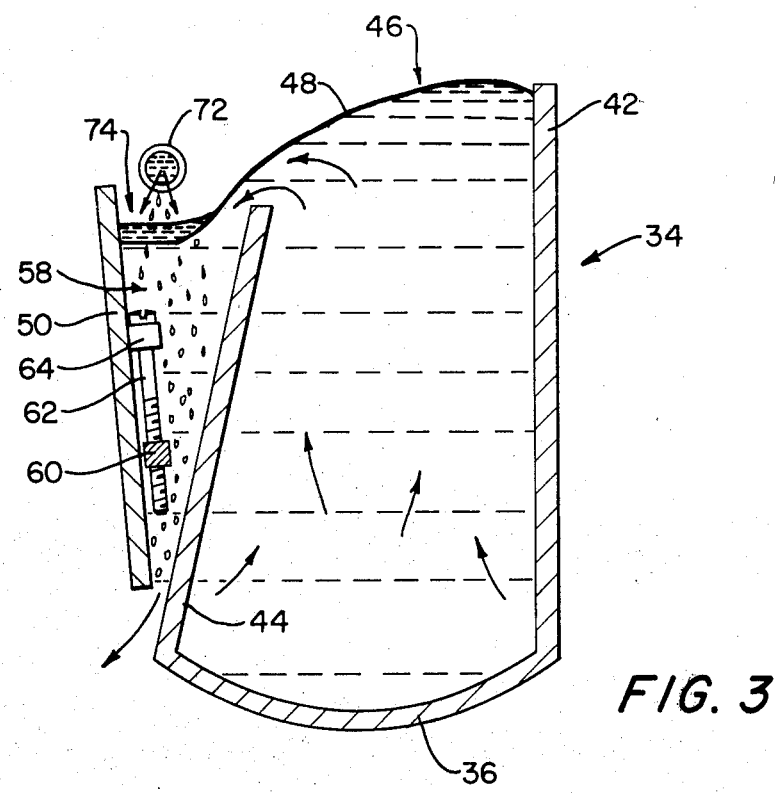
FIG. 3 is a cross-sectional view of the sump and fountain of the present invention taken on line 3—3 of FIG. 2.

Preferably and as shown in FIG. 3, sump front wall 44 is slightly lower in height than either of the side walls 38 and 40 or rear wall 42. With this arrangement, when solder is forced upwardly in the sump as will be described in detail hereinafter, solder will overflow out of nozzle 46 substantially in one direction as indicated by the arrows, in a wave form which has a gradually curved upper surface as shown generally at 48.

A sluice plate 50 is secured to the edges of sump side wall extensions or wings 52 and 54 by suitable securing means such as screws 56, and together with wings 52 and 54, and sump front wall 44 defines a downwardly extending return passage 58 for returning solder overflow from the nozzle to region of the first compartment 24 below solder level 30. Also included is a regulating means for regulating the flow of solder through passage 58. As shown in FIG. 31, the regulating means comprises a vertically adjustable bar 60 which extends horizontally entirely across the return passage. Bar 60 is supported by adjusting screws 62 and bosses 64 which are mounted on the interior of plate 50. Adjustment and manner of operation of the sluice plate will be described in detail hereinafter.

A conduit 66 is provided interiorly of compartment 24 for providing fluid communication between the solder layer in compartment 26 and sump 34. In order to minimize turbulence in the solder wave as shown, and to assure that substantially only solder be carried over by conduit 66 into the sump, the conduit inlet 68 and conduit outlet 70 should be disposed adjacent the lower portions of compartment 26 and sump 34, respectively.

The apparatus also includes another conduit 72 which provides fluid communication between oil layer in compartment 26 and the top area of the sluice plate indicated generally at 74. In order to assure that substantially only oil will be carried over by conduit 72, conduit 72 inlet 76 should be disposed in the upper portion of compartment 26 and in communication only with oil layer 33 above the solder therein.

Completing the invention are means such as a pump 78 and conduit 80 for transferring molten solder and oil from reservoir compartment 24 into reservoir compartment 26. As shown in FIG. 1, pump 78 has a first inlet 82 disposed in the molten solder in compartment 24 below solder level 30, and a second inlet 84 disposed in the oil layer 31 above the solder. The solder inlet 82 and the oil inlet 84 are connected to pump 78 via a common inlet tee 85. If desired, the pump may also include valve means 86 for adjusting the oil flow into the pump which in turn allows for adjusting the respective ratios of oil and solder pumped. Adjustable solder-/oil pumps are known in the art and described in detail for example in Walker et al U.S. Pat. No. 3,058,441.

In typical operation, a mixture of solder and oil are withdrawn from compartment 24 and pumped into compartment 26. The oil may be any suitable tinning or soldering oil or like liquid material known in the art for providing an oxygen barrier to protect the solder from exposure to the air. The oil and solder separate in compartment 26 into a dense lower layer of solder 32 and a relatively lighter oil layer 33. Solder 32 from the lower portion of compartment 24 flows through conduit 66 into sump 34, and due to the static pressure head of solder and oil in compartment 26, the solder rises through the vertical sides of sump 34 and cascades or overflows over the sump front wall 44. Simultaneously oil from the oil layer 33 in the upper portion of compartment 26 flows through conduit 72 and continuously blankets and mixes with the solder as the latter overflows into the sluice area 74. One skilled in the art will recognize that the addition of the oil to the sluice area will help to substantially reduce the formation and accumulation of dross in the sluice area. Bar 60 is adjusted so that the rate of flow of solder and oil through the return passage 58 is substantially equal to the rate of flow of solder and oil into the sluice area so as to thus maintain a constant level of oil and solder in the sluice. The solder and oil passes downwardly through passage 58 and is discharged into the solder layer in reservoir 24 below solder level 30, where the oil separates from the solder and rises to the surface.

One skilled in the art will recognize many advantages the present invention has over the prior art. For example, since there is no direct communication between pump 78 and sump 34, fluctuations in pump speed will in large part have little or no effect on wave height since wave height is primarily dependent on the static fluid head in compartment 26. Also, the mass of solder in compartment 26 provides a fluid buffer for substantially reducing any turbulence and/or surging as may result from the mechanical pumping action from reaching the solder wave.

One skilled in the art will recognize various changes may be made in the above-described invention without departing from the scope of the invention thereof. For example, separate pumps may be employed for pumping the solder and oil, respectively, from compartment 24 to compartment 26. Still other changes will be obvious to one skilled in the art.

What is claimed is:

1. A soldering system comprising:
   a container for holding a supply of molten solder, said container including a first compartment for holding a portion of said solder supply at a first liquid solder level with a layer of oil floating of said solder therein, and a second compartment for holding another portion of said solder supply at a second liquid solder level above said first liquid level and with a layer of oil floating on said another portion of solder therein;
   a sump and nozzle positioned in said first compartment so that said sump is partially submerged when said supply of molten solder therein is at said first liquid level, said nozzle being disposed above the surface of said oil layer in said first compartment but below said second solder liquid level,
   first conduit means having an inlet disposed in said second compartment and communicating with said solder therein, and an outlet disposed in said sump for carrying a flow of molten solder between said second compartment and said sump and to overflow said nozzle;
   second conduit means having an inlet disposed in said second compartment and communicating with said oil therein, and an outlet disposed adjacent said nozzle for carrying a flow of oil between said second compartment for depositing on the top of said solder overflow; and
   means for transferring molten solder and oil from said first compartment into said second compartment so as to maintain said second liquid solder level and said layer of floating oil.

2. A soldering system as claimed in claim 1 wherein said means for transferring comprises:
   a pump, said pump having a first intake communicating with said solder in said first compartment, a second inlet communicating with said oil in said first compartment and a common outlet; and
   third conduit means having an inlet communicating with said pump outlet, and an outlet disposed in said second compartment.

3. A soldering system as claimed in claim 2 wherein said first conduit outlet is disposed vertically above said third conduit inlet.

4. A soldering system as claimed in claim 2 wherein said second conduit inlet is disposed vertically above said first conduit outlet.

5. A soldering system as claimed in claim 1, and further including means for directing the overflow from said nozzle and said oil thereon below the surface of said portion of said solder supply in said first compartment.

6. A soldering system as claimed in claim 5 wherein said means for directing comprises an exterior sluice mounted on an exterior surface of said sump, said sluice adapted to conduct the overflow from said nozzle and said oil thereon through said layer of oil in said first compartment exterior of said sluice, and for discharging into said solder supply in said first compartment.

7. A soldering system as claimed in claim 6, and further including adjustable means for regulating the flow through said sluice.

* * * * *